US012565766B2

(12) United States Patent
Burlando

(10) Patent No.: US 12,565,766 B2
(45) Date of Patent: Mar. 3, 2026

(54) METHOD OF MANUFACTURING STORM DRAIN MARKERS

(71) Applicant: Albert A. Burlando, Wellington, FL (US)

(72) Inventor: Albert A. Burlando, Wellington, FL (US)

( * ) Notice: Subject to any disclaimer, the term of this patent is extended or adjusted under 35 U.S.C. 154(b) by 552 days.

(21) Appl. No.: 18/188,931

(22) Filed: Mar. 23, 2023

(65) Prior Publication Data

US 2024/0318418 A1 Sep. 26, 2024

(51) Int. Cl.
| | |
|---|---|
| *E03F 5/04* | (2006.01) |
| *B23K 26/38* | (2014.01) |
| *B23K 26/00* | (2014.01) |
| *B23K 103/04* | (2006.01) |

(52) U.S. Cl.
CPC .............. *E03F 5/041* (2013.01); *B23K 26/38* (2013.01); *B23K 26/0093* (2013.01); *B23K 2103/05* (2018.08); *E03F 2201/00* (2013.01)

(58) Field of Classification Search
CPC ...... E03F 5/041; E03F 2201/00; E02D 29/14; B23K 26/0093; B23K 26/38; C23D 5/00; C23D 5/06

USPC ............................................. 404/25, 72, 73
See application file for complete search history.

(56) References Cited

U.S. PATENT DOCUMENTS

| | | | | | |
|---|---|---|---|---|---|
| 5,842,811 | A | * | 12/1998 | Johnson .................. | E02D 29/14 |
| | | | | | 404/26 |
| 11,734,523 | B2 | * | 8/2023 | Klonsinski .............. | B32B 27/36 |
| | | | | | 340/13.26 |
| 2006/0037186 | A1 | * | 2/2006 | Burlando .............. | G09F 3/0292 |
| | | | | | 29/458 |

FOREIGN PATENT DOCUMENTS

| | | | | | |
|---|---|---|---|---|---|
| EP | 4393692 | A2 | * | 7/2024 | ........... B29C 59/026 |
| JP | 3213393 | U | * | 11/2017 | |
| KR | 20090004666 | U | * | 5/2009 | .............. G09F 7/06 |

* cited by examiner

*Primary Examiner* — Gary S Hartmann
(74) *Attorney, Agent, or Firm* — McHale & Slavin, P.A.

(57) ABSTRACT

A method of manufacturing a storm drain marker. The marker is constructed of a stainless steel plate with a front surface centrally disposed depression and a back surface that is recessed. The front surface is coated with a porcelain frit, and overlaid with a ceramic printed decal which is fused with the porcelain frit coating. The shaped plate forming an informational marker that can withstand long term exposure to the elements.

10 Claims, 3 Drawing Sheets

METHOD OF MANUFACTURING STORM DRAIN MARKERS

FIELD OF THE INVENTION

This invention is directed to the field of environmental protection, and in particular, to a method of manufacturing storm drain markers used to provide public awareness of storm drain pollutant issues.

BACKGROUND OF THE INVENTION

A storm drain refers to a type of drainage system designed to collect and direct rainwater runoff from streets, sidewalks, parking lots, and other surfaces during rainfall events. When it rains, the runoff from these surfaces flows into the storm drain system and is directed to a nearby body of water, such as creeks, streams, rivers, lakes, or oceans. When it rains, surfaces that have accumulated pollutants, such as oil, grease, pesticides, and fertilizers, are rinsed clean with the runoff, now a pollutant. When the runoff flows into storm drains, these pollutants are carried with it and ultimately discharged into nearby water bodies. To clarify, a sewer consists of underground pipes that carry water from structures (sinks, showers, toilets) to a wastewater treatment plant. The water directed to a sewer is filtered, treated, and discharged. The waste dumped into storm drains is not treated or filtered.

Storm drains are an essential component of urban infrastructure because they help to prevent flooding and water damage by quickly transporting rainwater away from developed areas. The design of storm drains can vary depending on factors such as the volume of runoff, the size of the drainage area, and the local topography. Storm drains typically consist of a network of pipes, ditches, or channels that are installed beneath or alongside paved surfaces. The drainage system typically involves several key components, including concrete or metal catch basins installed at low points along the street or other surfaces to collect runoff. They are typically made of concrete or metal and have a grated cover that allows water to enter while keeping debris and other materials out. Pipes used to transport water collected by catch basins to nearby water bodies are typically made of concrete or plastic and can range in diameter from a few inches to several feet. Inlets are openings in curbs or sidewalks that allow runoff to enter the storm drain system. Inlets are typically connected to catch basins and pipes to facilitate the flow of water. Outfalls are the locations where storm drain pipes discharge water into nearby water bodies, such as rivers, lakes, or oceans.

Storm drains lead to pollution when they collect and transport pollutants from these surfaces and discharge them into nearby water bodies. This is especially noticeable in communities where the water is immediately accessible, such as coastal communities. Storm drains can also become contaminated when people dump waste, such as trash and chemicals, into them. This waste can then be carried by storm water runoff and discharged into the ocean or other water bodies, causing pollution.

All of these sources of pollution can harm marine life, degrade water quality, and pose health risks to people who use the water for swimming or other recreational activities. TO reduce storm drain pollution, coastal communities have taken steps such as implementing best management practices to reduce runoff pollution, properly disposing of waste, and improving their sewage infrastructure. Unfortunately, many individuals do not realize that a storm drain is interconnected with a larger body of water, and the fluid placed in the storm drain will not be treated. With this lack of knowledge, they believe that fluid in the storm drain will be filtered. Automotive fluids, paint, pesticides, litter, household cleaning chemicals and the like are common storm drain contaminants. While numerous storm drain treatment systems are in use or have been proposed, educating the public regarding sensitive areas, such as storm drains, remains critical to assure that coastal water bodies remain clean and healthy.

Contaminating fresh or salt water sources has a domino effect. Pollutants can poison fish, and cloudy water can block the necessary light needed for plant growth. If the contaminated runoff goes to swimming bodies of water, swimmers are at risk and beaches may be closed. Even our drinking water can be contaminated by dumping or discharging into storm drains.

Individuals would not knowingly pour contaminating fluids into a storm drain if they knew the storm drain would drain directly to the water without treatment. For this reason, signage, such as markers, can be used to inform the public. Known markers made of plastic, aluminum, brass and stainless steel have a very limited life due to current construction techniques. For instance, improper coatings will serve to bake the plastic into a brittle state, causing disintegration in as little as three to five years.

Thus, what is needed in the industry is a marker that can be positioned adjacent to a storm drain as a reminder of waterway connection, the marker constructed of a material to provide at least fifty years of longevity.

SUMMARY OF THE INVENTION

Disclosed is a method of manufacturing storm drain markers. In a preferred embodiment, the markers are formed from a stainless steel 4" circular plate having a centrally disposed depression on a front side and a recessed surface on a back side of the plate. The plate is prepped by sandblasting both sides of the stainless steel before coating the front side surface with a porcelain frit, which is then baked to the plate at a high temperature. Once cooled, a ceramic based decal having indicia is placed on the front side of the plate and fused to the porcelain frit by high temperature. The marker is available for permanent securement to the storm drain or surrounding area by use of an adhesive fastener. Preferably, the marker is recessed, providing protection from snow plow blades and other devices that may otherwise attempt to remove the marker.

An objective of the invention is to disclose a method of manufacturing storm drain markers using a stainless steel base with a porcelain coating to provide longevity through resistance to chemical or ultra violet (UV) exposure.

Another objective of the invention is to provide a storm drain marker whose longevity exceeds over fifty years of outdoor placement without maintenance.

Still another objective of the invention is to provide a storm drain marker that is aesthetically pleasing and easily identifiable to provide local education.

Yet another objective of the invention is to provide a storm drain marker that can be used in raising funds for a community by providing a customizable marker with educational benefits.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
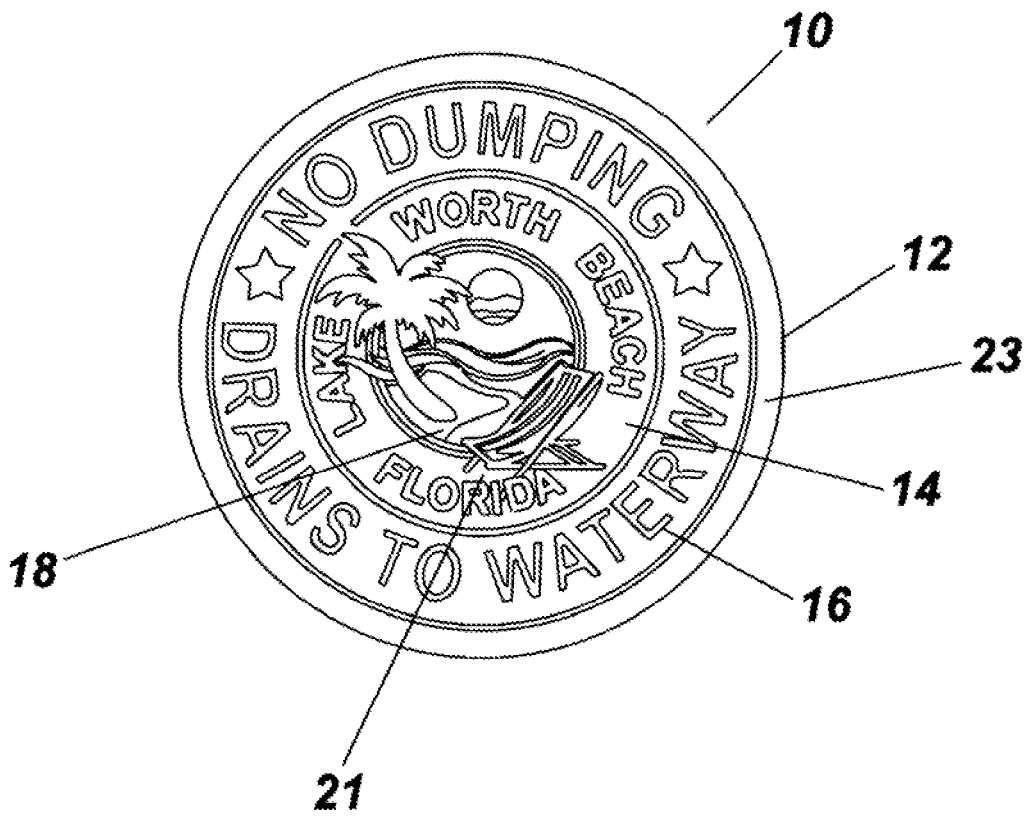
FIG. 1 is a front plane view of a storm drain marker.

Referring to FIG. 1, illustrated is a front plane view of a circular disc storm drain shaped plate 10. The shaped plate 10 has an outer edge 12 forming a plate diameter of four inches with a centrally disposed depression 14, the depression 14 providing greater surface adherence of the coating. Informational indicia are placed along an outer circumference 16, the preferred informational indicia consisting of "no dumping" and "drains to waterway". Other legends may indicate: drains to bay, drains to lake, drains to river, drains to ocean, or the like legend. Elective indicia may be placed along an inner circumference 18. The elective indicia are preferably community identification, but may also consist of symbols or the like artwork of wildlife that would be affected by the storm drain. For instance, symbols or artwork of fish, crab, lobster, turtles, manatees, frogs or the like. In a preferred embodiment, indicia are placed on a printed decal from a ceramic printer, namely a 3D printer designed to print on a substrate using a combination of clay, feldspar and other minerals; wherein placement of the decal over a porcelain base coating allows fusion between the base coating and decal upon fusing the minerals to the porcelain coating.

Figure 2A:
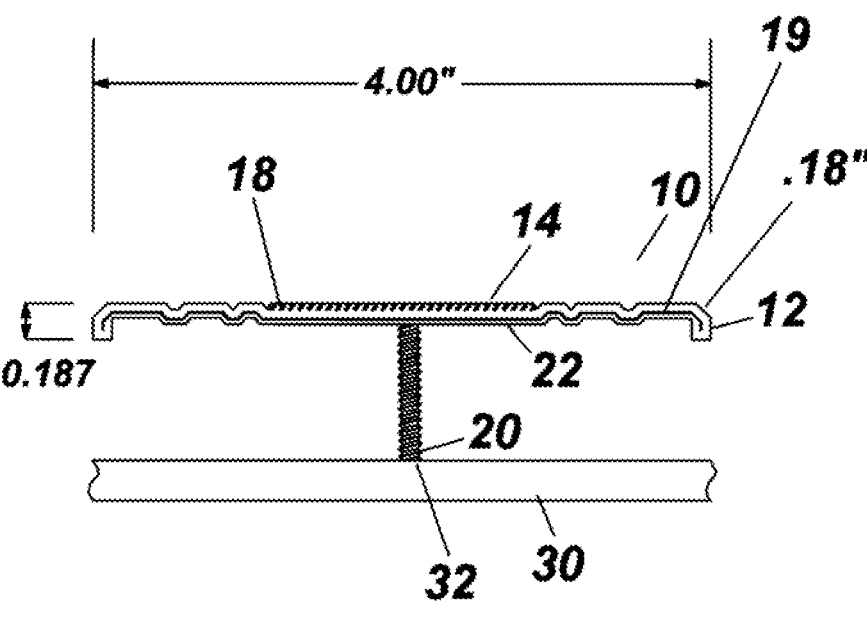
FIG. 2A is a cross-sectional side view of a shaped plate stud support.
Figure 2B:
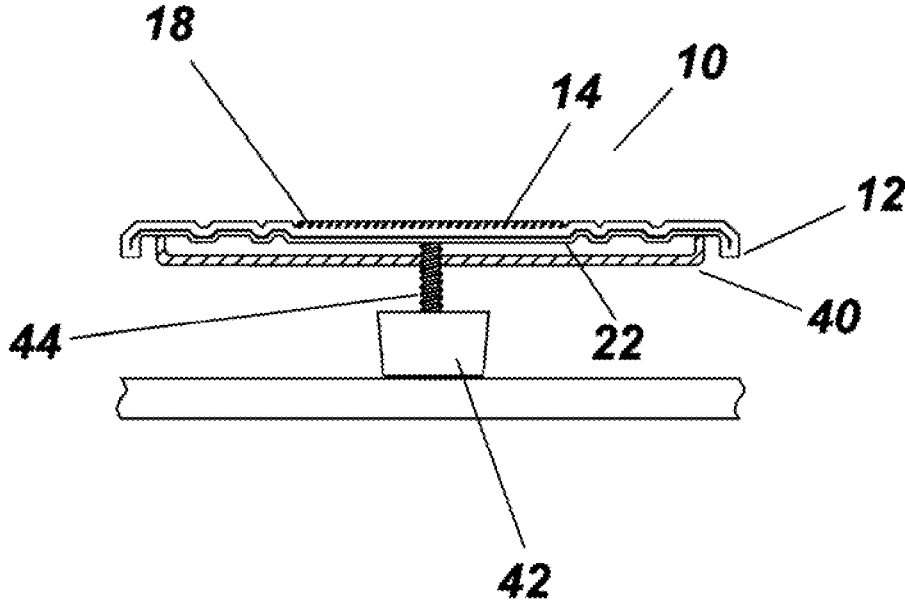
FIG. 2B is a cross-sectional side view of a shaped plate stand support.

FIG. 2A illustrates a cross-sectional side view of the storm drain shaped plate 10. In the preferred embodiment, the thickness of the plate is 0.18 inches with a depth of 0.187 inches formed by the radius on the edge. The centrally disposed depression 14 provides a shape receptive to a decal 21 that is fused to a porcelain coating 19. The porcelain coating 19 is capable of withstanding oscillating loads such as that caused by automobile tires rolling over the plate 10; the depression 14 limits the unreinforced area of the front surface 23 to further provide coating longevity. In one embodiment a threaded shank 20 is tack welded to the back surface 22 for use in the process of coating the plate 10. A carrier bar 30 having at least one threaded receptacle 32 provides support to the plate 10 during the manufacturing steps of coating and curing by high temperature, the threaded shank 20 being held by the carrier 30 during the processing steps. In an alternative embodiment illustrated in FIG. 2B, a plate tray 40 is secured to the back surface 22 of the shaped plate 10 for use in the process of coating the plate 10. A carrier bar 42 provides support to the plate 10 during the manufacturing steps of coating and curing by high temperature, the shank 44 being held by the carrier bar 42 during the processing steps.

Figure 3:
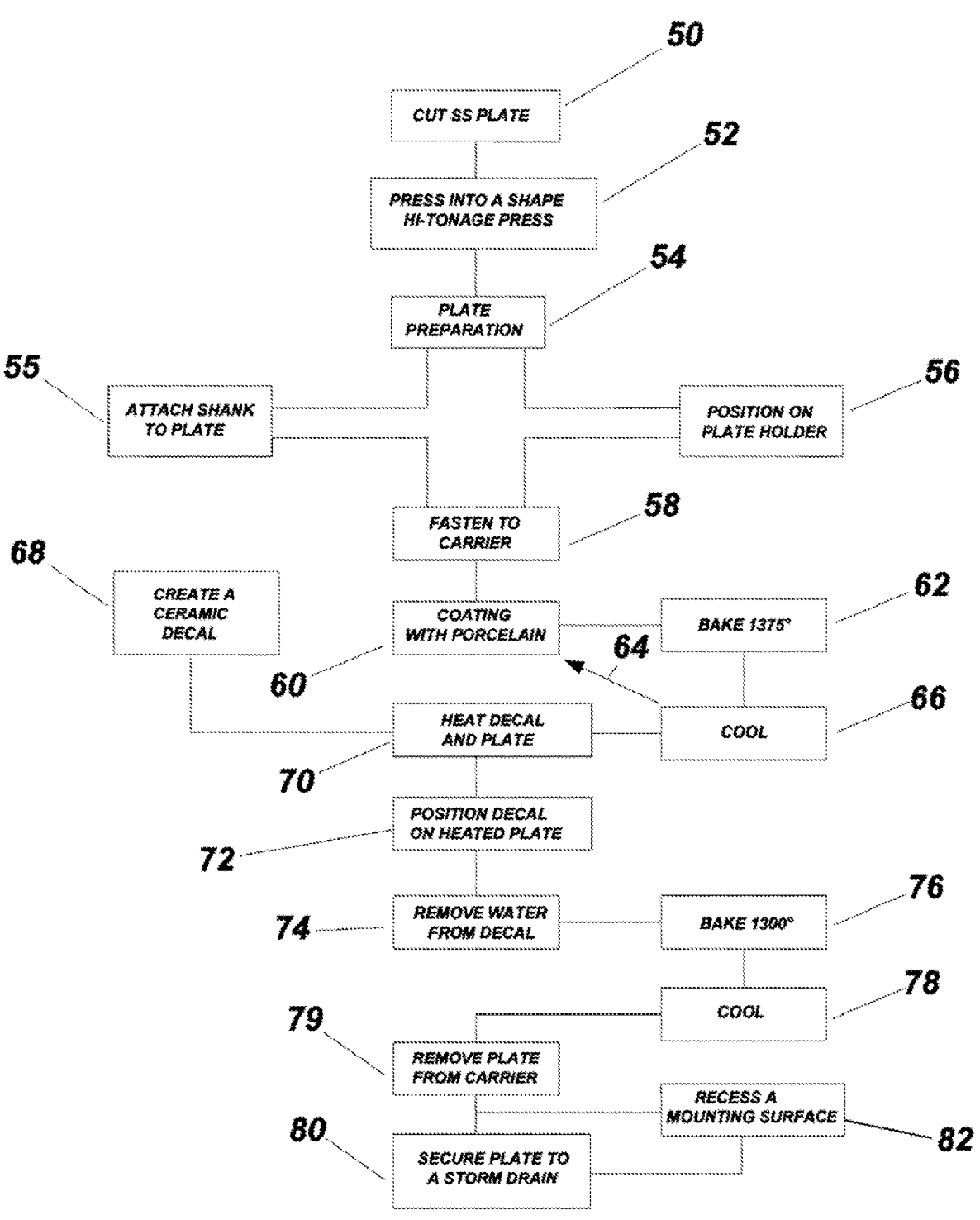
FIG. 3 is a flow chart of the manufacturing steps.

Referring now to Figures in general, and specifically FIG. 3, the method of manufacturing a storm drain marker of the instant invention comprises the steps of: cutting 50 a stainless steel plate having a thickness of about 0.0625 inch. The cutting can be performed by a CO-2 laser, or a stamp cutter. The shape of the plate 10 is preferably circular shaped with about a 4" outer diameter. However, the plate 10 may be square, rectangular shaped, or free formed, such as the outline of a manatee, dolphin, State of Texas, Empire State Building and so forth, forming an outer diameter with an ornamental shape. A hi-tonnage power press, namely a 400-ton press, is capable of amending the stainless steel plate to emboss 52 the plate with a single used to form an edge to conceal fastener adhesive. In one embodiment a centrally disposed depression on a front side of the plate 10, a 0.18 inch corner radius along an outer diameter of the plate 10, and a recess of about 0.187 inch depth on a back side of the plate 10. The press is also capable of forming imprinted raised letters on the front side of the plate.

Once the plate 10 has been cut, the plate 10 is checked for burrs and treated accordingly. The plate 10 is then sandblasted 54 in preparation of the coating process. In one embodiment, a threaded shank 20 is attached to the back 22 of the plate 10 by a tack welding step 55 so that the edge of the plate 10 can be uniformly coated, the threaded shank being attached to a carrier 30. Dissimilar metals are used, which allow the shank to be easily detached. The shank is then attached to a carrier 30 having sockets receptive to the threaded shank. In another embodiment, a plate holder 40 is employed 56 and coupled to a carrier, step 58.

The step of applying a white porcelain frit coating is applied 60 by liquid or powder electrostatic spraying is made to the front surface of the plate. The plate 10 is baked 62 at a temperature of at least 1,375 degrees Fahrenheit. Depending on the plate configuration, a second coating 64 of white porcelain frit may be applied for complete coverage. The plate is then cooled 66 before the next step.

A decal 68 to be fused to the porcelain is drawn on a computer and printed from a printer that employs a ceramic deposit; the decal containing indicia which is deposited through a printing process that contains sufficient silica in the finished decal. The finished decal is then heated in a bath of water 70 to at least 110 degrees Fahrenheit to cause a separation of the printed decal from a support substrate. Simultaneously, the plate is heated to about 110 Fahrenheit and the separated decal is positioned over the baked porcelain coating. The separated decal is saturated with water, which is expressed in a step by use of a press 74 expending about 25 lbs of pressure using a round polyurethane tip, the tip pressing the water and air from between the decal and the porcelain coating. As the round tip is depressed, the air and water is expressed outwardly with the tip applying the highest pressure at the impact point allowing a uniform pressure to be applied outwardly therefrom as the round tip is depressed. With the water and air expressed, the ceramic based decal having indicia is placed on the front side 23 of the plate and fused to the porcelain frit by subjecting the plate 10 to a temperature of at least 1, 300 degrees Fahrenheit 76 and then cooled 78. The plate 10 is removed 79 from the carrier and made available for permanent securement 80 to a storm drain or surrounding area by use of an adhesive fastener, or include a step of recessing a mounting surface 82. Preferably, the marker is recessed, providing protection from snow plow blades and other devices that may otherwise attempt to remove the marker. For instance, sub-surface installation of the marker can be accomplished by use of a 4" diameter drill to form a recess for the marker.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" or more features, possesses those one or more features, but is not limited to possessing only those one or more features. Furthermore, a device or structure that is configured in a certain way is configured in at least that way, but may also be configured in ways that are not listed.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of manufacturing a storm drain marker comprising the steps of:

cutting a stainless steel plate to form a shaped plate defined by an outer edge, said plate having a thickness of about 0.0625 inches;

pressing said shaped plate with a hi-tonnage power press forming at least one depression on a front surface of said shaped plate, and a 0.18 inch corner radius along said outer edge with a recess of about 0.187 inch depth on a back surface of said shaped plate;

sandblasting a front surface and a back surface of said shaped plate;

attaching said shaped plate to a carrier bar;

applying at least one white porcelain frit coating by liquid or powder electrostatic spray to said shaped plate front surface;

baking said shaped plate to a temperature of at least 1,375 degrees Fahrenheit in an oven until said porcelain frit coating is dry;

cooling said shaped plate;

creating a decal substrate with a ceramic printer;

heating said decal substrate in water having a temperature of at least 110 degrees Fahrenheit, and heating of said shaped plate to the same temperature as the heated water;

positioning said heated decal substrate on said front surface of said shaped plate;

displacing water and air trapped between said decal substrate and said shaped plate with a soft press applying at least 25 lbs. of pressure;

fusing said decal substrate to said porcelain coated front surface of said shaped plate by placement in an oven having a temperature of at least 1,300 degrees Fahrenheit;

cooling said shaped plate to an ambient temperature;

detaching said shaped plate from the carrier;

forming a recessed mounting surface approximate a storm drain; and applying an adhesive to the back surface of said shaped plate and permanently securing said shaped plate to a recessed mounting surface; wherein said shaped plate provides a storm drain informational marker.

2. The method of manufacturing storm drain markers according to claim 1, including the step of removing burrs from said shaped plate after sandblasting.

3. The method of manufacturing storm drain markers according to claim 1 wherein said step of cutting a stainless steel plate is performed using a CO-2 laser cutter.

4. The method of manufacturing storm drain markers according to claim 1 wherein said shaped plate is a 4" diameter disc.

5. The method of manufacturing storm drain markers according to claim 1 wherein said shaped plate is square or rectangular.

6. The method of manufacturing storm drain markers according to claim 1 wherein said shaped plate includes an outer diameter having an ornamental shape.

7. The method of manufacturing storm drain markers according to claim 1, wherein said hi-tonnage power press is a 400-ton press.

8. The method of manufacturing storm drain markers according to claim 1, wherein said shaped plate is attached to a carrier bar using a shank tack welded to the back surface of the shaped plate.

9. The method of manufacturing storm drain markers according to claim 1, wherein said shaped plate is attached to a carrier bar using a plate stand support.

10. The method of manufacturing storm drain markers according to claim 1, wherein said shaped plate is further secured to a storm drain with threaded fasteners.

* * * * *